United States Patent [19]
Masuzawa

[11] 3,739,251
[45] June 12, 1973

[54] MARINE AUTOPILOT SYSTEM

[75] Inventor: Isao Masuzawa, Tokyo, Japan

[73] Assignee: Kabushiki Kaisha Tokyo Keiki (Tokyo Keiki Co., Ltd.), Tokyo, Japan

[22] Filed: Mar. 3, 1971

[21] Appl. No.: 120,497

[30] Foreign Application Priority Data
Mar. 10, 1970 Japan.............................. 45/20289

[52] U.S. Cl. .............................................. 318/611
[51] Int. Cl. ........................................... G05b 5/01
[58] Field of Search ............................ 318/609–611

[56] References Cited
UNITED STATES PATENTS

| | | |
|---|---|---|
| 3,391,317 | 7/1968 | Bell.................................... 318/610 |
| 3,448,948 | 6/1968 | Reerink .............................. 318/611 |
| 3,454,749 | 7/1969 | Ross..................................... 318/609 |
| 3,458,784 | 7/1969 | Boskovich.......................... 318/611 |
| 3,477,014 | 11/1969 | Blythe................................ 318/610 |
| 3,227,935 | 1/1966 | Kawada .............................. 318/610 |

Primary Examiner—Harold Broome
Assistant Examiner—Thomas Langer
Attorney—Hill, Sherman, Meroni, Gross & Simpson

[57] ABSTRACT

A marine autopilot system having a circuit for generating a signal corresponding to the deviation of a ship's heading from a set course, a signal limiter circuit for limiting the signal derivered from the circuit, and a control device. In this case, the control device is supplied with the signal from the circuit and automatically control the signal limiter circuit at an optimum value in response to external disturbances exerted on the ship.

3 Claims, 6 Drawing Figures

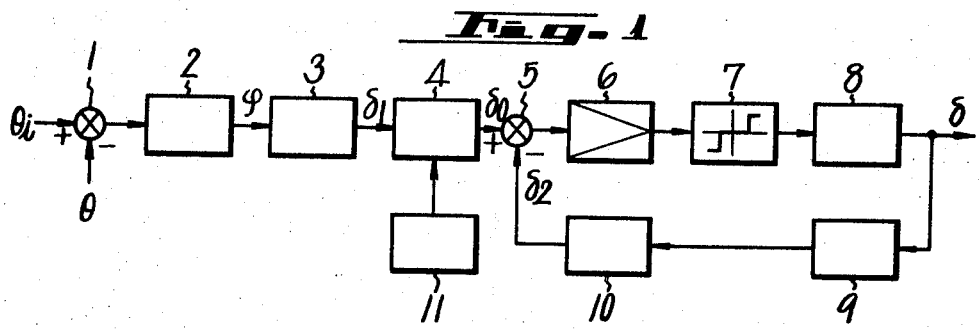
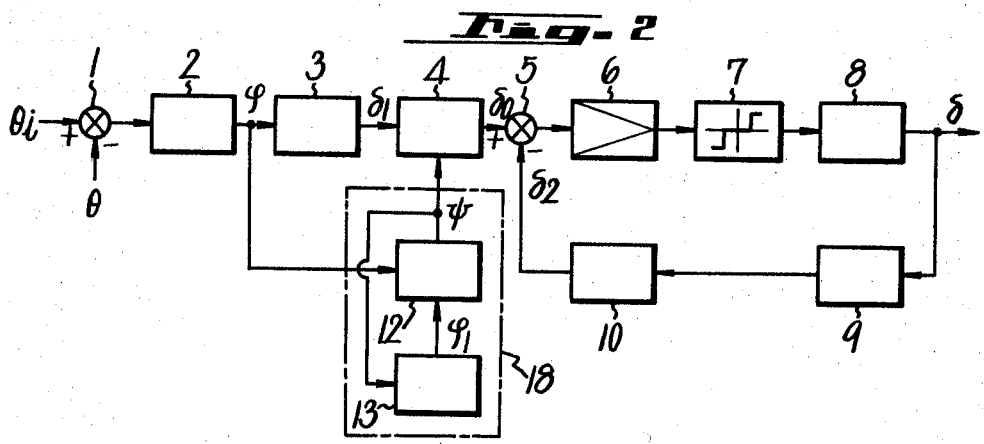
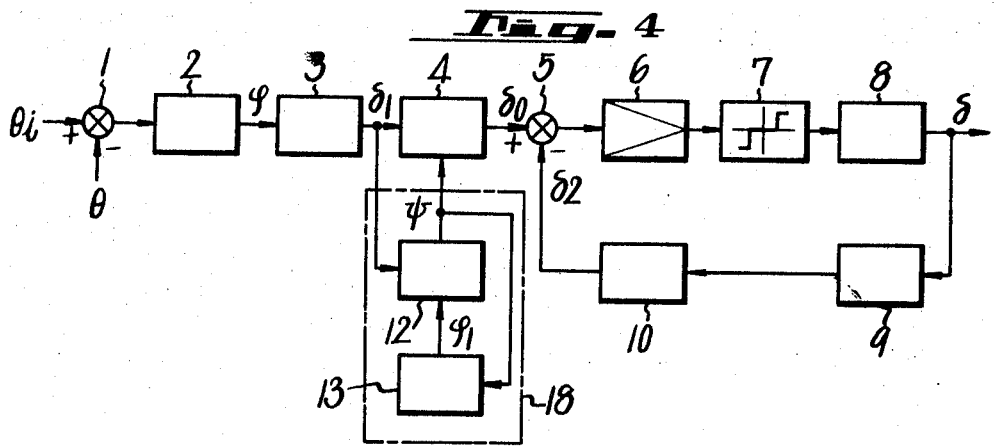

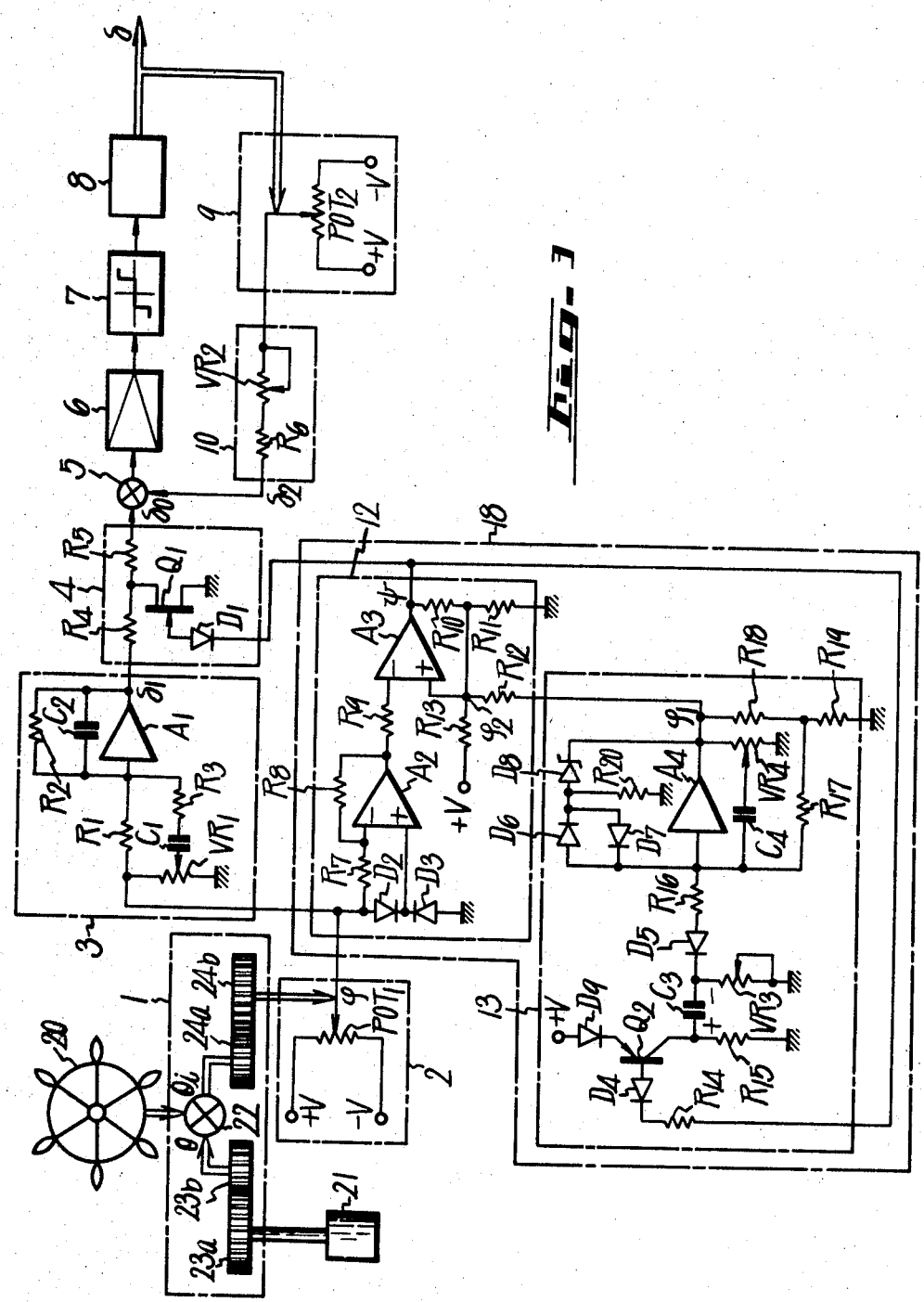

MARINE AUTOPILOT SYSTEM

BACKGROUND OF THE INVENTION

1. Field of the Invention

This invention relates to an automatic steering system, and more particularly to an autopilot system which is of particular utility when used with ships.

2. Description of the Prior Art

Generally, a ship in a seaway advances along her set course while conducting movements such as pitching, rolling and yawing of a substantially constant period under the influence of external disturbances such as waves, winds and so on. Of these movements, the yawing is transmitted to the autopilot by means of a compass mounted on the ship. In response to the yawing the automilot conducts steerage to control the ship to conform with her set course.

The frequency of the movement of the ship responding to a steering operation is far lower than the yawing frequency. Namely, it takes an appreciable amount of time for the ship to direct her heading to a desired direction in response to the steering operation. Accordingly, the ship cannot completely respond to steering operations of a frequency exceeding a certain value. In other words, steering operations of a frequency higher than the specific response frequency of the ship are all of no use in actual steering of the ship. While, the force exerting against the ship resulting from the steering operations causes considerable power loss of the ship. Since the driving source of the ship, namely the screw propeller is designed to provide the maximum efficiency when the rudder angle is zero, the reduction in the driving power efficiency resulting from every steering operation gives rise to a great loss. Therefore, it is desirable from a viewpoint of economical navigation to minimize the aforementioned useless steering operations which bring about many disadvantages such as above mentioned. Further, very frequent steering operations inevitably lead to wear of the steering gear namely remarkable shortening of the life of the steering gear.

In general, the external disturbances which cause the aforementioned useless steering operations of a ship vary with the conditions of loads in the ship and, at the same time, they are dependent upon continuously changing sea conditions such as winds, waves and so on. Therefore, an optimum adjustment by an operator in accordance with such external disturnances requires a considerable amount of skill and the adjustment must be achieved continuously.

SUMMARY OF THE INVENTION

Accordingly, the primary object of this invention is to provide a marine autopilot system which eliminates the aforementioned useless steering operation and ensures satisfactory best economical navigation of a ship.

Another object of this invention is to provide a marine autopilot system which automatically achieves optimum adjustment in response to external disturbances exerted on a ship in a seaway and ensures the most economical navigation of the ship at all times.

Other objects, features and advantages of this invention will become apparent from the following description taken in conjunction with the accompanying drawings.

BRIEF DESCRIPTION OF THE DRAWING

FIG. 1 is a block diagram for explaining the fundamental construction of a known autopilot system;

FIG. 2 is a block diagram illustrating one example of an autopilot system of this invention;

FIG. 3 is a connection diagram showing one concrete embodiment of the system exemplified in FIG. 2; and FIGS. 4 to 6, inclusive, are block diagrams showing modified forms of this invention.

DESCRIPTION OF THE PREFERRED EMBODIMENTS

Figure 5:
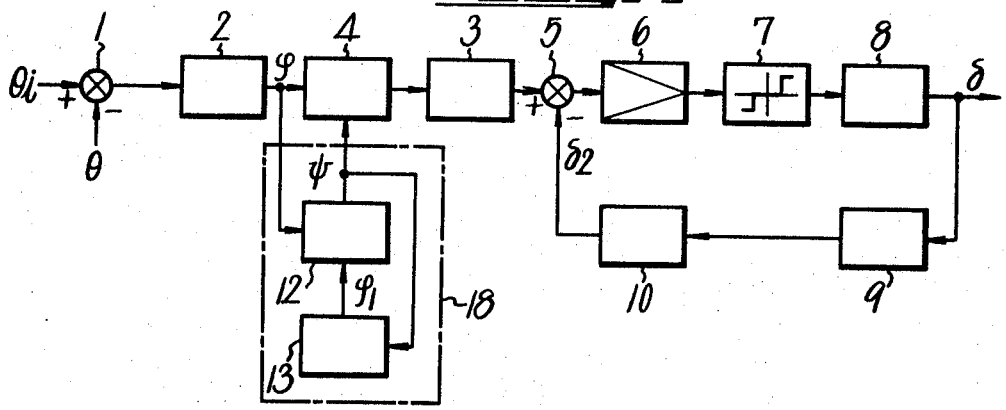

With reference to FIG. 1 a description will be given first of a conventional autopilot system. In such a known system the ship's heading $\theta$ continuously obtained by a gyrocompass or a magnetic compass is compared with a set course $\theta i$ by a adder 1 and a deviation $(\theta i - \theta)$ therebetween is converted by a detecting converter 2 into an electric signal $\phi$ corresponding to the deviation $(\theta i - \theta)$, which is supplied to an operational circuit 3. For example, in an automatic steering system performing PD (proportional and derivation) actions, the operational circuit 3 is to provide an electric signal proportional to the input signal $\phi$ and an electric signal proportional to a derivative value $\dot{\phi}$ of the signal $\phi$. An output $\delta_1$ from the operational circuit 3 is fed to a signal limiter (control) circuit 4. The limiting level of the signal limiter circuit 4 can be manually set at will by a limiting level set mechanism 11. One example of the signal limiter circuit 4 has such a characteristic that it is held low-conductive or nonconductive within the set value and that it becomes conductive when the level exceeds the set value. Further, the set mechanism 11 may be, for example, a variable resistor. The signal limiter circuit 4 and the level set mechanism 11 have such a function that prevents useless steering operations responsive to external disturbances imparted to the ship. An output $\delta_0$ from the signal limiter circuit 4 is applied through an adder 5 and an amplifier 6 to a relay operating element 7 to actuate it, thereby driving a motor, oil-pressure or like type power unit 8. An output $\delta$ from the power unit 8 is a signal corresponding to the mechanical position of the unit 8. The signal $\delta$ is converted by a converter 9 into a corresponding electric signal and is fed back to the adder 5 through a feedback circuit 10 as indicated by $\delta_2$. In the adder 5 the feedback signal $\delta_2$ is compared with the input signal $\delta_0$. Accordingly, when the feedback signal $\delta_2$ is in proportion to the output $\delta$ of the power unit 8, the output $\delta$ has a value proportional to the input signal $\delta_0$. That is, the output $\delta$ of the power unit 8 is representative of a rudder order angle of the automatic steering system. For a better understanding of the operation of the above autopilot system a brief description will be made thereof. The autopilot system employs as its input the ship's heading $\theta$ and the set course $\theta i$ and as its output the rudder order angle $\delta$ corresponding to the difference therebetween and performing, for example, the PD (the proportional and derivative) actions. In accordance with the rudder order angle $\delta$ a steering operation is conducted to correct the ship's heading $\theta$ to conform with the set course $\theta i$.

The conventional autopilot system is provided with the mechanisms 4 and 11 for avoiding the aforementioned useless steering operation to the external disturbances, although they are manually operated. However, the autopilot system is required to change the set value of the set mechanism 11 at all times so as to deal with everchanging external disturbances. In the event that the set value of the limiting level set mechanism 11 selected during sailing in a confused sea is left unchanged, and the ship sails on a calm sea with the above set value, the automatic steering loop produces yawing of long period to prevent economization of a navigation of the ship. While, also in the case where the set value of the set mechanism 11 selected during sailing on a calm sea is left unchanged and the ship sails in a confused sea, the useless steering operations take place to prevent economization of the ship navigation. Therefore, a strong demand has been made for an autopilot system which automatically alter setting value of the limiting level set mechanism 11 in response to external disturbances.

Referring now to FIG. 2, one example of the autopilot system of this invention will hereinafter be described. In FIG. 2 elements similar to those in FIG. 1 are indicated by the same reference numerals and will not be described for the sake of brevity.

The autopilot system of this invention depicted in FIG. 2 is different from the conventional system shown in FIG. 1 in the provision of an automatic limit level setting mechanism 18 made up of a limit level operation mechanism 13 and a limiter circuit drive mechanism 12 in place of the conventional limit level setting mechanism 11 of manual adjustment. The automatic limit level setting mechanism 18 is designed such that the limiter circuit drive mechanism 12 is supplied with the output of the converter 2, namely the electric signal $\phi$ proportional to the deviation of the ship's heading $\theta$ from her set course $\theta i$ and an output $\phi_1$ from the limit level operational mechanism 13 and that an output $\psi$ from the limiter circuit drive mechanism 12 is applied to the limit level operational mechanism 13 and the signal limiter circuit 4 respectively. One input $\phi$ to the drive mechanism 12 is produced by yawing of the ship caused by the external disturbances. In this case, if the amplitude of yawing is increased, in other words, the absolute value of the electric signal $\phi$ is increased and then the absolute value of the signal $\phi$ exceeds the output $\phi_1$ of the operational mechanism 13, the drive mechanism 12 is brought into a non-limited mode (which implies that steering operations of the ship take place in response to the yawing caused by the external disturbances) and the signal limiter circuit 4 is rendered into a non-limited condition by the output $\psi$ of the drive mechanism 12. Under such conditions, the absolute value of the output $\delta_0$ of the limiter circuit 4 increases to cause an increase in the rudder order angle $\delta$ as previously described with FIG. 1, by which the ship is driven so that the ship's heading $\theta$ may conform with the set course $\theta i$. Accordingly, the absolute value of the electric signal $\phi$ proportional to the deviation $(\theta i - \theta)$ also becomes small. When the absolute value of the electric signal $\phi$ has become smaller than the output $\phi_1$ of the operational mechanism 13, the drive mechanism 12 is altered into a limited mode (which implies that no steering operations take place in response to the external disturbances) and the limiter circuit 4 is also altered into a limited condition by the output $\psi$ of the drive mechanism 12. When the drive mechanism 12 has been altered into the limited mode from the non-limited mode, the output $\phi_1$ of the operational mechanism 13 increases up to a suitable value to positively hold the drive mechanism 12 in the limited mode. Further, the operational mechanism 13 is made to have such a characteristic that its output $\phi_1$ slightly decreases with the lapse of time. Therefore, even if the drive mechanism 12 is frequently altered into the limited mode from the non-limited mode and the output $\phi_1$ increases at every alternation, the output $\phi_1$ does not increase infinitely. When the ship is subject to great external disturbances in bad weather conditions and is thereby caused to yaw frequently, the conversion of the drive mechanism 12 from the non-limited mode to the limited mode becomes frequent and the average value of the output $\phi_1$ indicative of the limit level set value also increases. Namely, the limit level set value increases to thereby avoid useless steering operations responding to the external disturbances. While, when the weather has turned fine and yawing of the ship caused by the external disturbances has become smaller, the frequency of the conversion of the drive mechanism 12 from the non-limited mode to the limited mode becomes lower, so that the operational mechanism 13 decreases its output $\phi_1$ with the lapse of time, thereby to decrease the limit level set value. Generally, the average value of the external disturbances imparted to the ship remain unchanged at least for several hours and the average value of the limit level set value $\phi_1$ is held at an optimum value in response to the external disturbances all the while. That is, the increase in the output $\phi_1$ due to the frequency of the alteration of the drive mechanism 12 from the non-limited mode to the limited one is in equilibrium with the decrease in the output $\phi_1$ due to the lapse of time and the average value of the output $\phi_1$ is maintained at an optimum value corresponding to the external disturbances. Accordingly, with respect to gentle variations of the external disturbances for many hours, an optimum limit level set value is always automatically given as an averate value of the output $\phi_1$. In the case of yawing of a short period due to the external disturbances, when the amplitude of the yawing is in excess of the average value of the limit level set value $\phi_1$, the drive mechanism 12 is altered to the non-limited mode from the limited one to bring the limiter circuit 4 into its non-limited condition thereby to increase its output $\delta_0$ and hence increase the rudder order angle $\delta$, by which the ship is steered to suppress the yawing to correct the ship's heading $\theta$ to conform with the set course $\theta i$.

As above described, the autopilot system of this invention exemplified in FIG. 2 automatically achieves setting of the limit level in response to external disturbances, thereby to ensure safe and economical automatic steering.

The foregoing has outlined the principle of this invention and one example of its construction in connection with FIG. 2. With reference to FIG. 3 description will be given of the principal part of one example of the autopilot system of this invention, namely one embodiment of the automatic limit level set mechanism 18. In FIG. 3 elements similar to those in FIGS. 1 and 2 are identified by the same reference numerals. In the illustrated example the set course $\theta i$ is transmitted by a steering wheel or a course setting knob 20 to a differential gear 22 of the adder 1, while the ship's heading $\theta$ is transmitted from a gyrocompass or a magnetocompass to a repeater 21 (which is a synchro or a step motor) and the rotational angle of the repeater 21 is fed to the differential gear 22 through gears 23a and 23b.

The differential gear 22 produces as its output the deviation ($\theta i - \theta$) between the set course $\theta i$ and the actual ship's heading $\theta$ and this output is applied through gears 24a and 24b to a potentiometer $POT_1$ of the converter 2 to drive it. The potentiometer $POT_1$ is connected to a DC power source $\pm V$ and produces an output voltage $\phi$ proportional to the position of its slider. Namely, the electric signal $\phi$ is in proportion to the deviation ($\theta i - \theta$). The electric signal $\phi$ is supplied to the operational circuit 3, which produces a PD (proportional + derivative) signal in response to the input signal $\phi$ and derives it therefrom as an output $\delta_1$. Namely, the operational circuit 3 need not be limited specifically to the illustrated one, so long as it is a known circuit capable of generating the PD signal. In the present example the operational circuit 3 is made up of an operational amplifier $A_1$, a resistor $R_1$ and a capacitor $C_1$ connected to the input side of the amplifier $A_1$ for the proportional and derivative signals respectively, a variable resistor $VR_1$ for adjustment of the amount of the derivative signal and a resistor $R_3$ for filtering the derivative signal, a resistor $R_2$ and a capacitor $C_2$ both connected to a feedback circuit of the operational amplifier $A_1$. The output $\delta_1$ of the operational amplifier 3 is supplied to the signal limiter circuit 4 to derive therefrom an output $\delta_0$ through resistors $R_4$ and $R_5$. The output $\delta_0$ is applied to the adder 5. In the signal limiter circuit 4, for example, a field effect transistor $Q_1$ is connected between the connection point of the resistors $R_4$ and $R_5$ and ground. A diode $D_1$ is connected to the gate of the field effect transistor $Q_1$ and the output $\psi$ of the limiter circuit drive mechanism 12 is supplied through the diode $D_1$ to the gate of the field effect transistor $Q_1$ to control it to be conductive or nonconductive. The output $\delta_0$ of the limiter circuit 4 is applied through the adder 5 to the servo amplifier 6 to drive the relay unit 7. The relay unit 7 consists of two relays selectively actuated in accordance with a polarity of the output of the servo amplifier 6 or two relay amplifier one of which is selectively actuated in accordance with the polarity of the output from the servo amplifier 6. By the relay unit 7 the power unit 8 is driven to vary its output $\delta$. The operation of the power unit 8 is transmitted to the slider of a potentiometer $POT_2$ of the converter 9. The potentiometer $POT_2$ of the converter 9 is connected to a power source $\pm V$ and the potential of the slider of the potentiometer $POT_2$ is in proportion to the mechanical output $\delta$ of the power unit 8. the slider of the potentiometer $POT_2$ feeds the electric signal $\delta_2$ to the adder 5 through a series circuit of a variable resistor $VR_2$ and a resistor $R_6$ making up the feedback circuit 10. The electric signal $\delta_2$ and the output $\delta_0$ of the limiter circuit 4 are made opposite in polarity and the power unit 8 is driven until the input to the servo amplifier 6 is reduced to zero. Accordingly, the mechanical output of the power unit 8, namely the rudder order angle $\delta$ is in proportion to the output $\delta_0$ of the limiter circuit 4 and the proportional constant of the rudder order angle $\delta$ is adjusted by the variable resistor $VR_2$ of the feedback circuit 10. That is, the variable resistor $VR_2$ is to adjust the rudder angle ratio of the autopilot system. The converters 2 and 9 are described to be potentiometers but they may be made up of a synchro motor and a demodulator, to which case, too, the present invention is applicable. Further, this invention can be used with a system in which the adjustment of the rudder angle ratio is achieved by attenuating the electric signal $\delta_0$ instead of the feedback circuit 10.

A detailed description will be given of the construction and operation of one embodiment of the automatic limit level set mechanism 18 which is a main constructional feature of the autopilot system of the present invention. The automatic limit level set mechanism 18 consists of the limiter circuit drive mechanism 12 and the limit level operational mechanism 13 and the operational amplifier $A_2$ of the drive mechanism 12 is supplied with the electric signal $\phi$ representative of the deviation of the ship's heading from the set course, as above described. An input circuit of the amplifier $A_2$ consists of a resistor $R_7$ inserted between the negative input terminal (−) of the amplifier $A_2$ and the input $\phi$ of the drive mechanism 12 and two diode $D_2$ and $D_3$. In this case, the positive input terminal (+) of the amplifier $A_2$ is connected to the connection point of the diodes $D_2$ and $D_3$ interconnected in series in backward direction between the output end of the potentiometer $POT_1$ and ground. Further, a resistor $R_8$ is connected between the output terminal and the negative input terminal (−) of the amplifier $A_2$. The amplifier $A_2$ of such a construction generates as its output the absolute $|\phi|$ of the input $\phi$, as is well known, which is applied through a resistor $R_9$ to the negative input terminal (−) of an operational amplifier $A_3$. Meanwhile, the positive input terminal (+) of the amplifier $A_3$ is connected to the connection point of resistors $R_{10}$ and $R_{11}$ and the output $\psi$ of the amplifier $A_3$ is voltage-divided by the resistors $R_{10}$ and $R_{11}$ and the divided voltage is positively fed back to the positive input terminal (+). Further, a power source $+V$ is connected through a resistor $R_{13}$ to the positive input terminal (+) to bias it. In addition, the output $\phi_1$ of the limit level operational mechanism 13 is fed through a resistor $R_{12}$ to the positive input termianl (+) of the amplifier $A_3$. Accordingly, the potential $\phi_2$ at the positive input terminal (+) of the amplifier $A_3$ is dependent upon the output $\psi$ of the amplifier $A_3$, the bias voltage $+V$ and the output $\phi_1$ of the limit level operational mechanism 13 but the output $\psi$ among the voltage signals $\psi$, $+V$ and $\phi_1$ is positively fed back to the amplifier $A_3$ to provide it with a hysteresis characteristic for stabilization of its operation and this output $\psi$ does not greatly affect the potential at the positive input terminal (+) of the amplifier $A_3$. The voltage $+V$ is a bias power source for making the potential $\phi_2$ a little positive even when the output $\phi_1$ is zero and does not greatly affect the potential $\phi_2$. The voltage $+V$ may be omitted, if desired. Further, the output $\phi_1$ exerts a great influence upon the potential $\phi_2$ to make it proportional to the output $\phi_1$. Therefore, when the absolute value ($|\phi|$) of the potential $\phi$ at the negative input terminal of the amplifier $A_3$ is lower than that of the potential $\phi_2$ at the positive input terminal of the amplifier $A_3$, the output $\psi$ of the amplifier $A_3$ becomes a saturated positive potential of the amplifier $A_3$ to conduct the field effect transistor $Q_1$ of the limiter circuit 4. Namely, while the output $\psi$ of the amplifier $A_3$ is the saturated positive potential, the limiter circuit drive mechanism 12 remains in the non-limited mode. When the absolute value of the potential $\phi$ at the negative input terminal of the amplifier $A_3$ is greater than that of the potential $\phi_2$ at the positive input terminal of the amplifier $A_3$, the output $\psi$ of the amplifier $A_3$ becomes a saturated negative potential of the amplifier $A_3$ to make the field effect transistor $Q_1$ of the limiter circuit 4 nonconductive. That is, while the output $\psi$ of the amplifier $A_3$ is the saturated negative potential, the limiter circuit drive mechanism 12 remains in the limited mode.

The following will describe the construction of the limit level operational mechanism 13. Namely, the output $\psi$ of the limiter circuit drive mechanism 12 is applied through a resistor $R_{14}$ and a diode $D_4$ to the base of a transistor $Q_2$, whose emitter is connected to a power source $+V$ through a diode $D_9$ and whose collector is grounded through a resistor $R_{15}$ and connected to one electrode of a capacitor $C_3$, a variable resistor $VR_3$ being connected between the other electrode of the capacitor $C_3$ and ground. The connection point of the capacitor $C_3$ with the variable resistor $VR_3$ is connected to the input terminal of an operational amplifier $A_4$ through a series circuit of a diode $D_5$ and a resistor $R_{16}$. Further, the output terminal of the amplifier $A_4$ is grounded through a series circuit of resistors $R_{18}$ and $R_{19}$ and a resistor $R_{17}$ is inserted between the connection point of the resistors $R_{18}$ and $R_{19}$ and the input terminal of the amplifier $A_4$. The output terminal of the amplifier $A_4$ is grounded through a variable resistor $VR_4$ and a capacitor $C_4$ is connected between the slider terminal of the variable resistor $VR_4$ and the input terminal of the amplifier $A_4$. The output terminal of the amplifier $A_4$ is further connected to its input terminal through a Zener diode $D_8$ for limiting the output of the amplifier $A_4$ and a diode $D_7$ connected to the Zener Diode $D_8$ in a reverse direction and a diode $D_6$ is connected in parallel to the diode $D_7$ in a reverse direction. Further, a resistor $R_{20}$ is connected between the connection point of the Zener diode $D_8$ and the diode $D_7$ and ground. The output of the limit level operational mechanism 13 of the above construction, namely the output $\phi_1$ of the amplifier $A_4$ is fed through the resistor $R_{12}$ to the positive input terminal of the amplifier $A_3$ of the limiter circuit drive mechanism 12 as previously described.

A description will be made in connection with the operation of the limit level operational mechanism 13 constructed as above described. When the limiter circuit driven mechanism 12 is in the limited mode and its output $\psi$ is the saturated positive potential, the transistor $Q_2$ of the limit level operational mechanism 13 is in the off state. When the limiter circuit drive mechanism 12 has been altered into the non-limited mode and its output $\psi$ has become a saturated negative potential, the transistor $Q_2$ becomes conductive and the capacitor $C_3$ of the limit level operational mechanism 13 is charged with the polarity indicated in FIG. 3. At this time, a voltage is produced across the variable resistor $VR_3$ by the charging current but the impression of this voltage to the amplifier $A_4$ is prevented by the diode $D_5$. Accordingly, the amplifier $A_4$ is not ever affected by this voltage. Then, when the limiter circuit drive mechanism 12 has been returned to the limited mode and its output $\psi$ has become the saturated positive potential, the transistor $Q_2$ becomes nonconductive and the charge stored in the capacitor $C_3$ is discharged through the circuit $C_3 - R_{15} - VR_3 - C_3$. With the discharge current, the voltage generated across the variable resistor $VR_3$ makes the diode $D_5$ conductive to flow a current in the input circuit of the amplifier $A_4$. Since the feedback circuit of the amplifier $A_4$ has incorporated therein the capacitor $C_4$, the amplifier $A_4$ performs the function of an integrator. Accordingly, the output $\phi_1$ of the amplifier $A_4$ increases so that a feedback current may be produced corresponding to the total sum of its input current. In addition, the amplifier $A_4$ had added thereto the discharge circuit made up of the resistors, $R_{17}$, $R_{18}$ and $R_{19}$, so that the charge stored in the capacitor $C_4$ is discharged little by little through the discharge circuit with the lapse of time, thereby to decrease gradually the output $\phi_1$ of the amplifier $A_4$ with the lapse of time.

With the above-described characteristics of the limit level operational mechanism 13, namely due to the facts that when the limiter circuit drive mechanism 12 is altered from the non-limited mode to the limited mode, the output $\phi_1$ of the limit level operational mechanism 13 increases and that the output $\phi_1$ gradually decreases with the lapse of time, the limit level set value is automatically operated or calculated. It is a very important characteristic that only when the limiter circuit drive mechanism 12 is altered from the non-limited mode to the limited one, the output $\phi_1$ of the limit level operational mechanism 13 increases. The reason is that if the output $\phi_1$ is increased when the drive mechanism 12 is altered from the limited mode to the non-limited one, the mechanism 12 is immediately returned to the limited mode to prevent necessary steering operation from taking place. With the drive mechanism 12 and the limit level operational mechanism 13, the limit level is automatically established in response to the external disturbances, thereby ensuring safe and economical automatic steering of the ship in a seaway. In this case, the Zener diode $D_8$ used in the limit level operational mechanism 13 is to determine the upper limit of the output $\phi_1$ of the amplifier $A_4$, which corresponds to a maximum limit level set value required for the autopilot system. Further, the variable resistor $VR_3$ employed in the limit level operational mechanism 13 is to adjust the amount of an increase in the output $\phi_1$ of the limit level operational mechanism 13 when the limiter circuit drive mechanism 12 is altered from the non-limited mode to the limited one. The variable resistor $VR_4$ is to adjust the ratio in which the output $\phi_1$ decreases with the lapse of time. As to the adjustment of the variable resistors $VR_3$ and $VR_4$, it is sufficient to adjust them at suitable values only once when the autopilot system is installed by an expert.

In the autopilot system of this invention exemplified in FIG. 3 the limiter circuit drive mechanism 12 may be other electric circuit, so long as it performs similar function. For example, the absolute value characteristic circuit of the amplifier $A_2$ may be any one of many other known circuits and the amplifier $A_3$ may be a comparator, of Schmitt circuit or the like. Further, the limit level operational mechanism 13 mentioned above is a staircase wave generator circuit and need not be limited specifically to the aforementioned electric circuit shown in FIG. 3 but may be any other type of circuit, for example, a mechanical type or electromechanical type one. In addition, the limiter circuit 4 depicted in FIG. 3 may be replaced with, for example, a circuit in which a MOS-FET transistor is connected in parallel to the resistor $R_4$ or $R_5$ instead of the field effect transistor $Q_1$. Similarly, the operational circuit 3 need not be limited specifically to the example in FIG. 3 but may be a circuit of the type employing a plurality of capacitors and resistors without using the operational amplifier $A_1$ or a circuit in which the derivative signal is not produced by the capacitor $C_1$ but obtained from a tachometer incorporated in the gyrocompass and applied to the input of the amplifier $A_1$.

Further, there is an automatic steering system of the type which produces the PD (proportional + derivative) signal in the operational circuit 3 and the PI (proportional + integral) signal in the feedback circuit 10 and performs the PID (proportional + integral + derivative) action as a whole, or an automatic steering system which produces the P (proportional) signal in the operational circuit 3 and the PID (proportional + integral + derivative) signal in the feedback circuit 10 and performs the PID (proportional + integral + derivative) action as a whole. It will been seen that the main novel portion of the autopilot system of this invention, namely the automatic limit level set mechanism 18 can be used, as it is, in the above examples.

FIG. 4 illustrates a modified form of the autopilot system of this invention, in which elements corresponding to those in FIG. 2 are designated by the same reference numerals and characters. In the foregoing example of the autopilot system of this invention depicted in FIG. 2, the output $\phi$ of the converter 2, namely the electric signal proportional to the deviation $(\theta i - \theta)$ is used as the input to the limiter circuit drive mechanism 12. However, the example of FIG. 4 employs, as the input to the limiter circuit drive mechanism 12, the output of the operational circuit 3, namely the electric signal $\delta_1$ proportional to the PD (proportional + derivative) values of the deviation $(\theta i - \theta)$. Except this, the example of FIG. 4 is substantially identical with that of FIG. 2 and no detailed description will be repeated for the sake of brevity. In the autopilot system exemplified in FIG. 4, too, an optimum limit level set value is automatically selected by the automatic limit level set mechanism 18 in response to the external disturbances, thereby to ensure safe and economical automatic steerage.

Since the operation of the autopilot system shown in FIG. 4 can well be understood from the explanation made in connection with the example of FIG. 2, no description will be repeated for the sake of simplicity. Further, the limiter circuit drive mechanism 12 and the limit level operational mechanism 13 may be the same in construction as those used in example of FIG. 3.

Further, the automatic limit level set mechanism 18 of this invention depicted in FIG. 4 can be used with an autopilot system of the type that the PD (proportional + derivative) action signal and the PI (proportional + integral) action signal are respectively produced by the operational circuit 3 and the feedback circuit 10 and the PID (proportional + integral + derivative) action is performed as a whole, or an autopilot system of the type that the proportional action signal and the PID (proportional + integral + derivative) action signal are respectively produced by the operational circuit 3 and the feedback circuit 10 and the PID (proportional + integral + derivative) action is performed as a whole. Also in this case, safe and economical automatic steerage can be provided.

FIG. 5 illustrates another modification of the autopilot system of the present invention, in which elements similar to those in FIG. 2 are identified by the same reference numerals and characters. The present example is identical with that of FIG. 2 except only in such an arrangement of the components 3 and 4 that the output $\phi$ of the converter 2 supplied with the deviation $(\theta i - \theta)$ between the set course $\theta i$ and the actual ship's heading $\theta$ from the adder 1 is applied through the limiter circuit 4 to the operationa circuit 3, whose output is fed to the adder 5. Therefore, no detailed description will be repeated for the sake of brevity. In the autopilot system of such a construction, too, an optimum limit level is automatically established by the automatic limit level set mechanism 18 in response to the external disturbances, thereby ensuring safe and economical steerage. In this case, the internal construction of the automatic level set mechanism 18 may be substantially identical with that of the example shown in FIG. 3.

The aforementioned automatic limit level set mechanism 18 according to this invention can be used with an autopilot system of the type which produces the PD (proportional + derivative) signal in the operational circuit 3, the proportional signal in the feedback circuit 10 or the operational circuit 3 and the PD (proportional + derivative) signal in the feedback circuit 10 and performs the PD (proportional + derivative) action as a whole, or an autopilot system which produces the PD (proportional + derivative) signal in the operational circuit 3, the PI (proportional + integral) signal in the feedback circuit 10 or the PID (proportional + integral + derivative) signal in the operational circuit 3, the proportional signal in the feedback circuit 10 and the proportional signal in the operational circuit 3 and performs the PID (proportional + integral + derivative) action in the feedback circuit 10. Also in this case, an optimum limit level is automatically established in response to the external disturbances to assure safe and economical automatic steerage.

Figure 6:
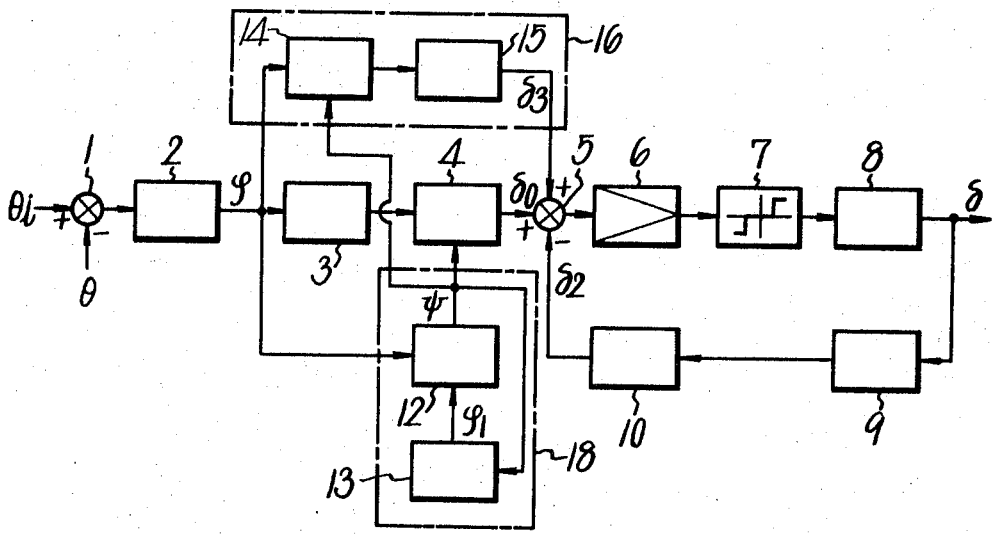

FIG. 6 shows still another modification of this invention, in which elements corresponding to those in FIG. 2 are indicated by the same reference numerals and characters. The illustrated example is substantially identical in construction with that of FIG. 2 except in that the output $\phi$ of the converter 2 and the output $\psi$ of the limiter circuit drive mechanism 12 are fed to other limiter circuit 14, whose output is supplied to an integration circuit 15, the output $\delta_3$ of which is, in turn, applied to the adder 5. In the present example the integration circuit 15 produces an integral action signal, the operational circuit 3 provides the PD (proportional + derivative) action signal and the feedback circuit 10 produces the proportional signal, and the autopilot system performs the PID (proportional + integral + derivative) action as a whole.

Also in the autopilot system of such a construction as shown in FIG. 6, the automatic limit level set mechanism 18 achieves the same operation as that previously described in connection with FIGS. 2 and 3 and provides safe and economical automatic steerage. The limiter circuit 14 may be the circuit 4 illustrated in FIG. 3 or those such as referred to in connection with the example 3. Further, the integration circuit 15 may be a known integrator employing a capacitor in the feedback circuit of the operational amplifier.

Autopilot systems, in which a block 16 consisting of the limiter circuit 14 and the integration circuit 15 as shown in FIG. 6 is connected in the examples of FIGS. 4 and 5 in the same manner as in FIG. 6, though not shown, and the PID (proportional + integral + derivative) action is achieved, also provide safe and economical automatic steerage.

With the autopilot system of the present invention above described, the limit level automatic set mechanism automatically calculates an optimum limit level in accordance with sea conditions at all times to control the limiter circuit, namely automatically performs optimum weather adjustment of the automatic steering system in response to external disturbances without any manual operation, thereby insuring safe and economical navigation of ships.

It will be apparent that many modifications and variations may be effected without departing from the scope of the novel concepts of this invention.

I claim as my invention:

1. A marine autopilot system comprising: means for generating a deviation signal in response to a given deviation of a ship heading from a set course, a signal limiter, means for coupling the deviation signal to the signal limiter, first and second control means, means for coupling said deviation signal to said first control means, said first control means having an output coupled to an input of said second control means, and to an input of said signal limiter, said second control means having an output coupled to an input of said first control means, said first control means being a device for comparing the output of the second control means with the deviation signal and for developing limit and non-limit signals in response thereto at its output, said limit and non-limit signals being coupled to said signal limiter, said control means being means for counting the number of conversions of the output of the first control means between the limit and non-limit states and said output of said second control means being caused to reflect the number of such conversions said signal limiter having an output connected to a steering means to provide the deviation signal at said output when said non-limit signal is developed, whereby external disturbances on the ship which are useless to steering operations may be prevented from operating said autopilot.

2. An autopilot system as set forth in claim 1 wherein a second signal limiter is provided, said second signal limiter having an output from said first control means coupled thereto, and the output from said second signal limiter being combined with the output from said first signal limiter.

3. An autopilot system as set forth in claim 1 wherein the first control means includes an absolute value circuit and a comparator, the absolute value circuit having the deviation signal coupled thereto, the comparator having means for comparing the output of the absolute value circuit with the output of the second control means and wherein the signal limiter is controlled by the output of said comparator.

* * * * *